US010997753B2

(12) United States Patent
Hamill (10) Patent No.: US 10,997,753 B2
(45) Date of Patent: May 4, 2021

(54) DATA-DRIVEN RESPIRATORY WAVEFORM ESTIMATION BASED ON SPIRAL CT

(71) Applicant: Siemens Medical Solutions USA, Inc., Malvern, PA (US)

(72) Inventor: James J. Hamill, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 97 days.

(21) Appl. No.: 16/502,396

(22) Filed: Jul. 3, 2019

(65) Prior Publication Data
US 2020/0013199 A1 Jan. 9, 2020

Related U.S. Application Data

(60) Provisional application No. 62/694,579, filed on Jul. 6, 2018.

(51) Int. Cl.
*G06K 9/00* (2006.01)
*G06T 11/00* (2006.01)
*G06T 7/246* (2017.01)

(52) U.S. Cl.
CPC ............ *G06T 11/005* (2013.01); *G06T 7/248* (2017.01); *G06T 2207/10081* (2013.01); *G06T 2207/10104* (2013.01); *G06T 2210/41* (2013.01)

(58) Field of Classification Search
None
See application file for complete search history.

(56) References Cited

U.S. PATENT DOCUMENTS

| 2017/0079608 A1* | 3/2017 | Hamill | A61B 6/5235 |
| 2017/0091929 A1* | 3/2017 | Hofmann | A61B 6/032 |
| 2017/0304649 A1* | 10/2017 | Sumita | A61B 6/032 |

OTHER PUBLICATIONS

Chang, Guoping, et al., "Implementation of an Automated Respiratory Amplitude Gating Technique for PET/CT: Clinical Evaluation," J. Nucl. Med. 2010; 51:16-24.
Hamill, James, et al., "Respiartory Phase Matching in PET/CT Using Fast Spiral CT," J Nucl Med May 1, 2017 vol. 58 no. supplement 1 577.
Kesner, Adam, et al., "On transcending the impasse of respiratory motion correction applications in routine clinical imaging—a consideration of a fully automated data driven motion control framework," EJNMMI Physics 2014, 1:8.
Pan, Tinsu, et al., "New prospective 4D-CT for mitigating the effects of irregular respiratory motion," Phys. Med. Biol. 62 (2017) N350-N361.
Schleyer, Paul, et al., "Retrospective data-driven respiratory gating for PET/CT," Phys. Med. Biol. 54 (2009) 1935-1950.
Werner, R., et al., "Proxy-free low-pitch helical 4DCT reconstruction," Estro 36, May 5-9, 2017.

* cited by examiner

*Primary Examiner* — Atiba O Fitzpatrick (57) ABSTRACT

A system and method of image reconstruction is disclosed. First image scan data corresponding to a spiral CT modality received during a first time period is received. The first image scan data includes at least partially overlapping axial positions. A change in position over time for each of the at least partially overlapping axial positions is determined and a first respiratory waveform is estimated from the change in position over time for each of the at least partially overlapping axial positions.

17 Claims, 7 Drawing Sheets

DATA-DRIVEN RESPIRATORY WAVEFORM ESTIMATION BASED ON SPIRAL CT

CROSS-REFERENCE TO RELATED APPLICATIONS

This application claims benefit of U.S. Provisional Application Ser. No. 62/694,579, filed on Jul. 6, 2018, the disclosure of which is incorporated herein by reference in its entirety.

FIELD

Aspects of the present disclosure relate in general to nuclear imaging systems, and more particularly to spatial mismatch reduction in PET/CT scans.

BACKGROUND

During a normal positron emission tomography (PET)/computed tomography (CT) scan, CT scan data is generally acquired during free breathing or under breathing instructions while PET scan data is generally acquired during free breathing. During image capture, the patient's anatomy expands and contracts in the anterior/posterior direction as the patient breathes, causing the skin to move up and down relative to a patient bed at positions between the pelvis and the mid to upper lungs. CT scan data is acquired rapidly such that each axial position may be represented by just one respiratory phase or amplitude. The CT phase or amplitude and the phase or amplitude needed for PET reconstruction are usually different. In order to align the CT scan data and the PET data spatially, information is needed about the phase or amplitude during CT scan data acquisition.

Current systems may ignore respiratory information or may obtain phase or amplitude data using hardware inputs, such as strain gauges and/or optical tracking. Current systems may use amplitude data for respiratory gating in PET imaging and/or perform respiratory gating for both CT and PET imaging. Hardware for measuring respiration requires calibration and alignment prior to data capture. Further, the hardware must be maintained in a fixed position during the entirety of all scans (e.g., PET, CT, etc.) in order to provide accurate respiration information.

SUMMARY

In various embodiments, a method of nuclear imaging is disclosed. The method includes a step of receiving, by a processor, first image scan data corresponding to a first imaging modality received during a first time period. The first image scan data includes at least partially overlapping axial positions. A change in position over time for each of the at least partially overlapping axial positions is determined by the processor and a first respiratory waveform is determined from the change in position over time for each of the at least partially overlapping axial positions.

In various embodiments, a system is disclosed. The system includes a first imaging modality configured to obtain first image scan data during a first time period and a computer. The first image scan data includes at least partially overlapping axial positions. The computer is configured to receive the first image scan data and determine a change in position over time for each of the at least partially overlapping axial positions. The computer is further configured to determine a first respiratory waveform from the change in position over time for each of the at least partially overlapping axial positions.

In various embodiments, a non-transitory computer readable medium storing instructions is disclosed. The instructions are configured to cause a computer system to execute a step of receiving first image scan data corresponding to a first imaging modality received during a first time period. The first image scan data includes at least partially overlapping axial positions. The instructions are further configured to cause the computer system to determine a change in position over time for each of the at least partially overlapping axial positions and determine a first respiratory waveform from the change in position over time for each of the at least partially overlapping axial positions.

BRIEF DESCRIPTION OF THE DRAWINGS

The following will be apparent from elements of the figures, which are provided for illustrative purposes and are not necessarily drawn to scale.

DETAILED DESCRIPTION

This description of the exemplary embodiments is intended to be read in connection with the accompanying drawings, which are to be considered part of the entire written description.

Various embodiments of the present disclosure address the foregoing challenges with hardware-based waveform matched PET/CT scans. In some embodiments, systems and methods for performing data-driven gated image reconstructions are disclosed. CT projection data P(D,R,t), where D and R are discrete detector rows and t is the time of the reading, are received during a spiral CT scan. The CT scan data may be provided from the scanning modality to a system, such as a computer, configured to generate a waveform from the CT scan data. The patient's breathing is commonly characterized by a respiratory waveform, whose time derivative can be estimated from time differences derived from aligned CT scan data acquired at successive time points (e.g., overlapping views of the same patient anatomy at ¼ second intervals). The respiratory waveform can be estimated by mathematical manipulations of the estimated time derivative. Listmode PET data may be received for the same patient, for example, using a second imaging modality. Data-driven gating is performed on the listmode PET data to generate a respiratory waveform corresponding to the PET scan. A waveform matched reconstruction is performed using the generated CT respiratory waveform, the generated PET respiratory waveform, and the listmode PET data.

Figure 1:
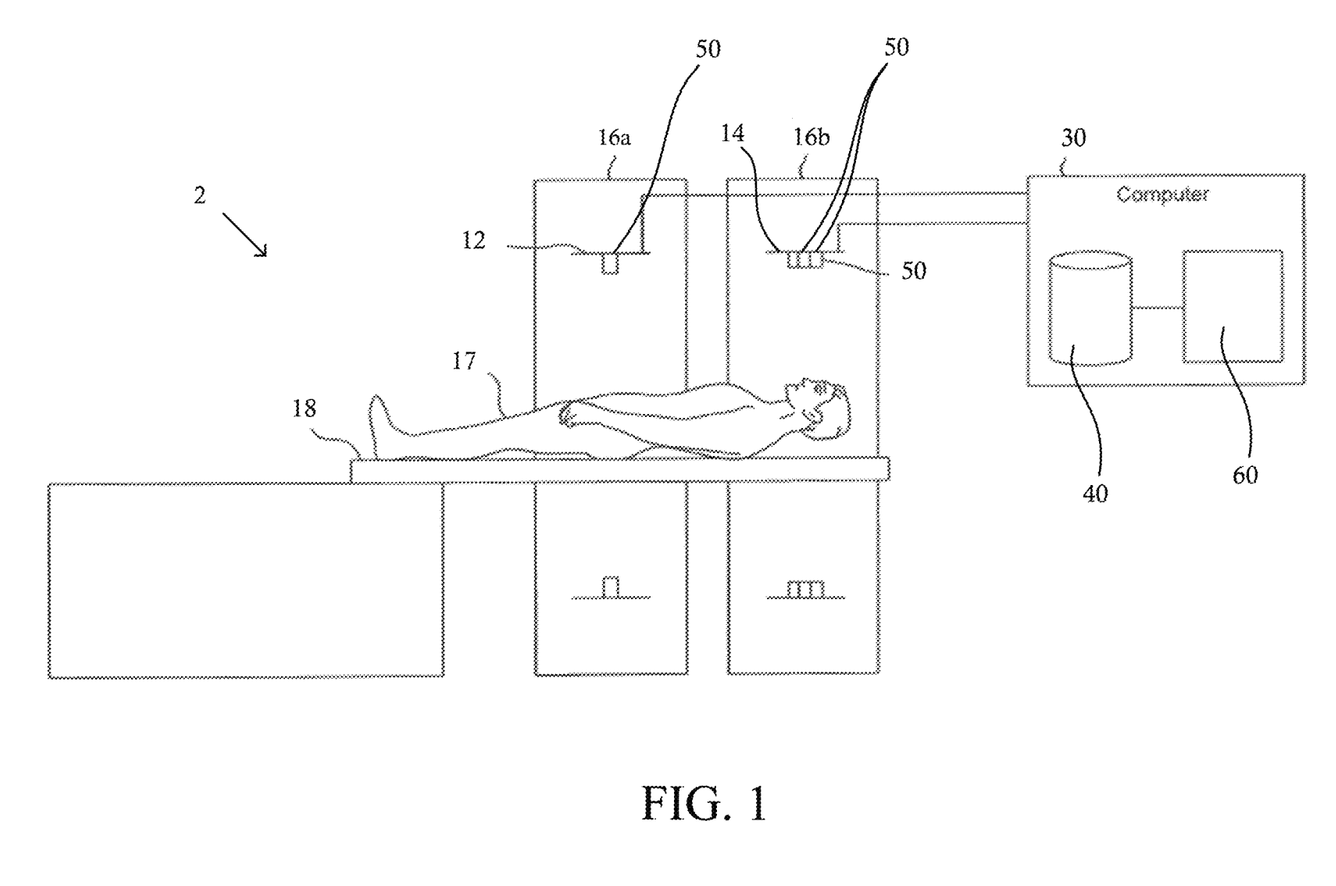
FIG. 1 illustrates a nuclear imaging system, in accordance with some embodiments.

FIG. 1 illustrates one embodiment of a nuclear imaging system 2. The nuclear imaging system 2 includes a scanner for at least a first modality 12 provided in a first gantry 16a. In various embodiments, the first modality 12 is a CT modality, such as a spiral CT modality. A patient 17 lies on a movable patient bed 18 that may be movable between a gantry. In some embodiments, the nuclear imaging system 2 includes a scanner for a second imaging modality 14 provided in a second gantry 16b. The second imaging modality 14 can be any suitable imaging modality, such as, for example, PET modality, single-photon emission computerized tomography (SPECT) modality and/or any other suitable imaging modality. Each of the first modality 12 and/or the second modality 14 can include one or more detectors 50 configured to detect an annihilation photon, gamma ray, and/or other nuclear imaging event.

Scan data from the first modality 12 is stored at one or more computer databases 40 and processed by one or more computer processors 60 of a computer system 30. The graphical depiction of computer system 30 in FIG. 1 is provided by way of illustration only, and computer system 30 may include one or more separate computing devices. The imaging data sets can be provided by the first modality 12 and/or may be provided as a separate data set, such as, for example, from a memory coupled to the computer system 30. The computer system 30 can include one or more processing electronics for processing a signal received from one of the plurality of detectors 50.

Figure 2:
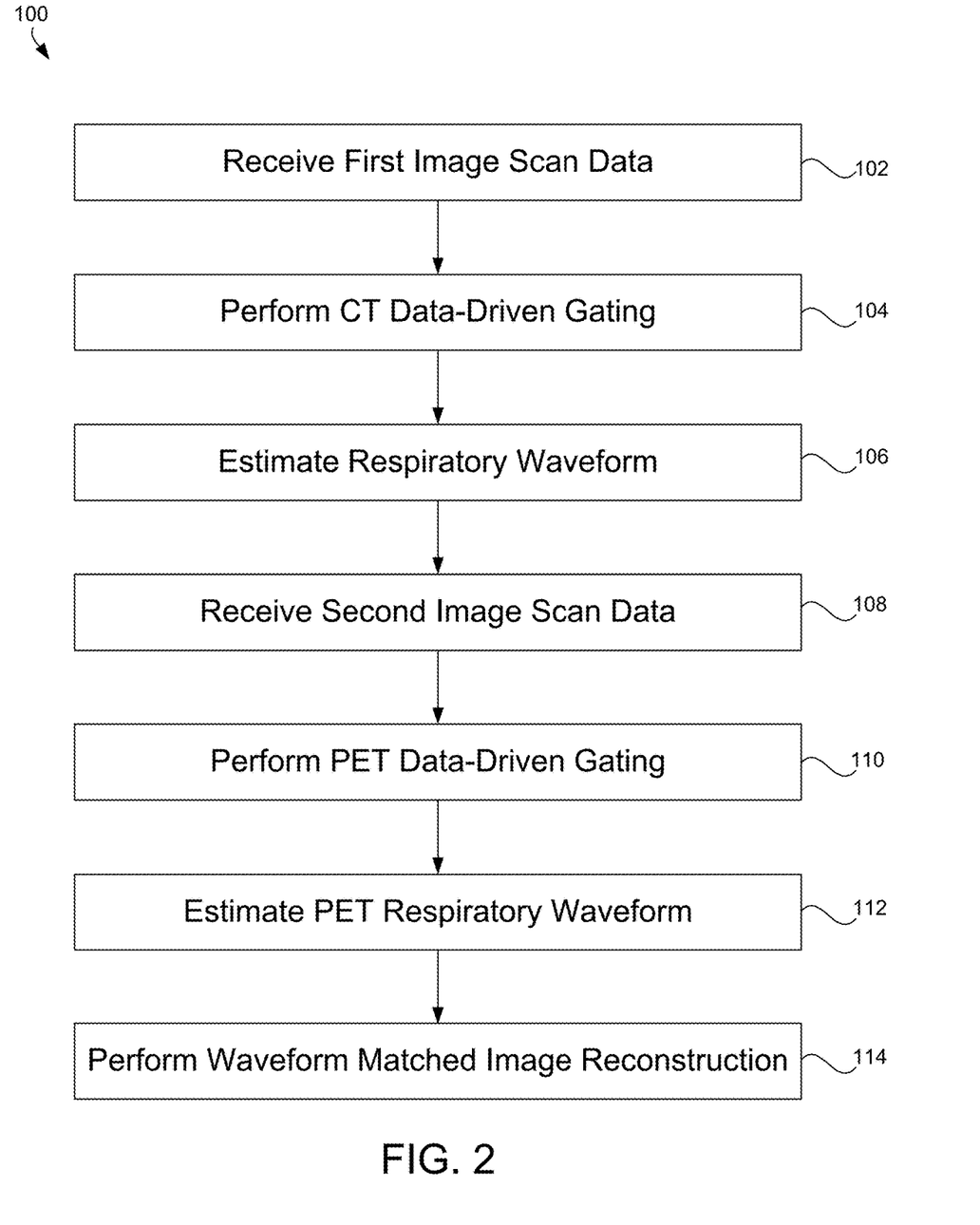
FIG. 2 is a flowchart illustrating a method of data driven gating (DDG) for a combined CT and positron emission tomography (PET) scan, in accordance with some embodiments.

FIG. 2 is a flowchart 100 illustrating a method of performing data-driven gated image reconstruction, in accordance with some embodiments. At step 102, first image scan data, such as CT scan data, is received by a processor, such as the processor 60 of the computer system 30 discussed above. In an embodiment, the first image scan data is CT scan data and the CT scan data is received by an imaging modality, such as a first modality 12 as illustrated in FIG. 1. The first imaging modality may be any suitable imaging modality, such as, for example, a low-pitch spiral X-ray CT scanner, etc. The CT scan data is received during a first time period. The spiral CT scanner includes a predetermined pitch and a predetermined time of rotation. In some embodiments, the predetermined pitch may be selected to compensate for measurement caused by imaging modality's movement along a z-axis (i.e., along the length of the patient). For example, in some embodiments, the predetermined pitch is less than 1, although it will be appreciated that any suitable pitch can be used, such as, for example, a pitch less than 1.5, a pitch less than or equal to 1.3, a pitch less than or equal to 1.0, a pitch less than or equal to 0.8, and/or any other acceptable pitch. The CT scan data may be provided to a system, such as the system 30 described above in conjunction with FIG. 1. In some embodiments, Z-axis movement (or a Z-axis) is defined as movement along a patient's long axis, X-axis movement (or an X-axis) is defined as extending to the patient's left, and Y-axis movement (or a Y-axis) extends up and down from a patient.

Figure 3A:
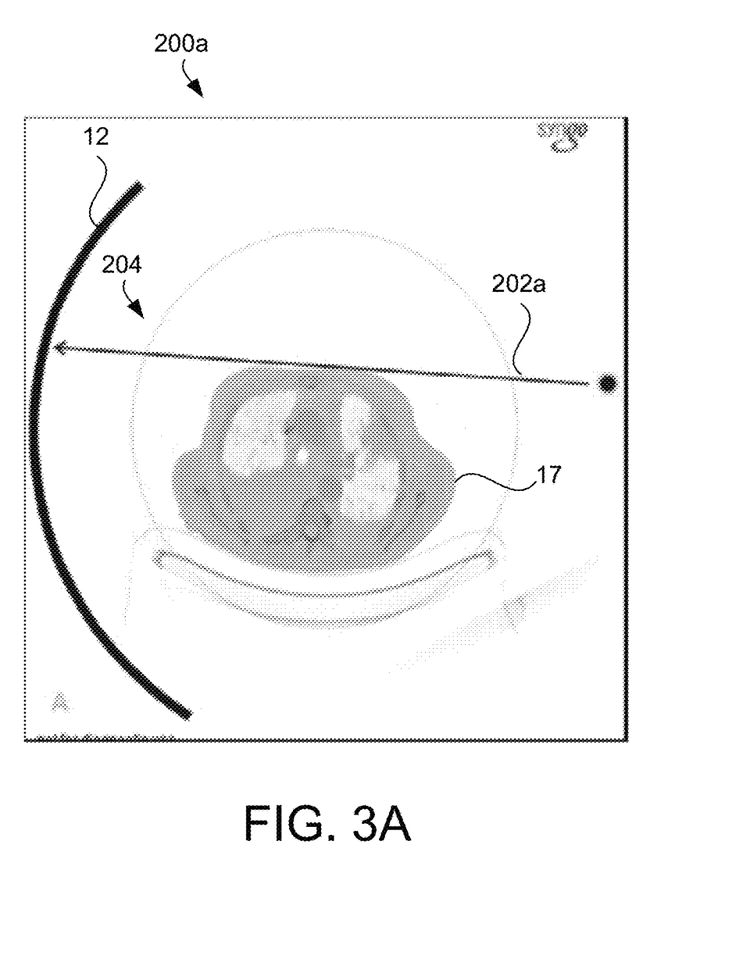
FIG. 3A illustrates a first ray measured by a nuclear imaging device during a nuclear imaging scan, in accordance with some embodiments.
Figure 3B:
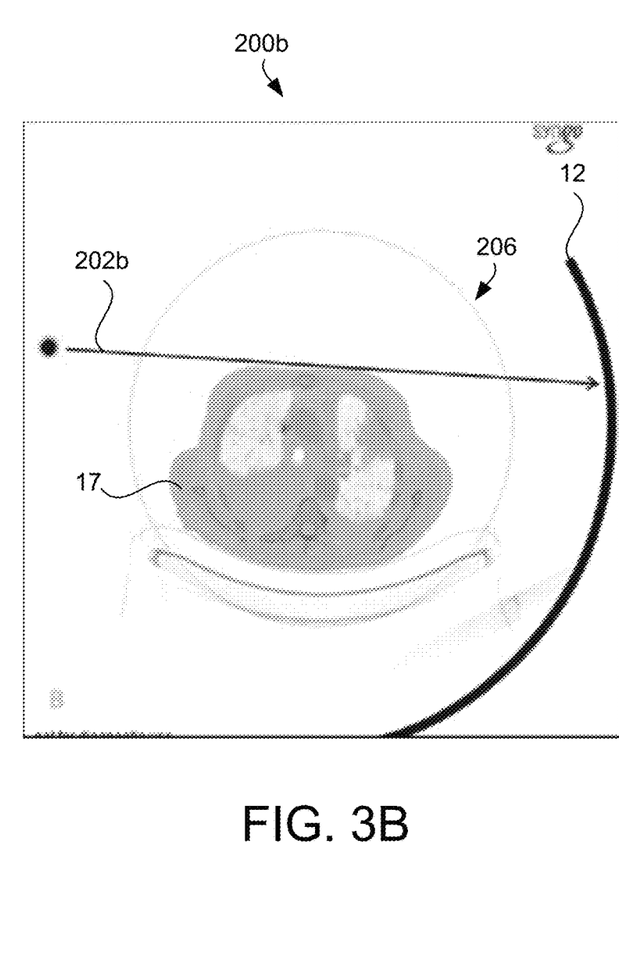
FIG. 3B illustrates a second ray measured by a nuclear imaging device during the nuclear imaging scan, in accordance with some embodiments.

The CT scan data includes overlapping scans that have variable surface height due to respiratory motion (e.g., CT scan data is captured during variable respiratory cycles). For example, in some embodiments, FIGS. 3A and 3B show overlapping positions of rays (e.g., X-rays) received by an imaging modality during a spiral CT scan performed on a patient. The rays used during a CT scan may be X-rays or other invisible-spectrum rays generated by an image modality and which pass through a patient to a detector positioned on a second side 206 of the patient. FIG. 3A illustrates a first projection 200a including a first ray 202a captured by the first image modality 12 while positioned on a first side 204 of the patient 17, as shown in FIG. 3A. FIG. 3B illustrates a second projection 200b in which the first image modality 12 has rotated to a second side 206 of the patient 17 to capture a second ray 202b. The time of rotation of the first image modality 12 is selected such that the first ray 202a and the second ray 202b are captured at an overlapping axial position with respect to the patient but at different times. In the example of a scan direction from head to toes, the ray 202a may be seen by one of the first detector rows to pass over this axial position in the patient, whereas the ray 202b may be seen by one of the last detector rows to pass over this location as the patient moves relative to the scanner. The measurement interval may include any suitable interval, such as, for example, an interval greater than 0.25 seconds, an interval equal to or greater than 0.5 seconds, etc. The overlapping rays 202a, 202b provide overlapping axial position data for different points in time. The overlapping positions may be provided by left and right lateral views, overlapping axial views captured from the same lateral side, and/or a combination thereof.

With reference again to FIG. 2, in some embodiments, at step 104, data-driven gating, such as CT data-driven gating (CT-DDG), is performed to obtain the time derivative of a first respiratory waveform from the captured CT scan data for discrete axial positions. For example, in some embodiments, the system compares CT scan data at overlapping axial positions to obtain a change over time (i.e., positional difference $\Delta y$ that occurs over time interval $\Delta t$) of the movement of the patient at the overlapping axial position. As used herein, the term "overlapping" refers to both fully and partially overlapping axial positions. The change in time at each overlapping axial position is representative of the time derivative of the first respiratory waveform for the patient at that axial position. In some embodiments, an estimate of the time derivative is used to identify one or more respiratory phases of the patient. For example, in some embodiments, the estimate of the time derivative data may be used to identify full inspiration (inhalation) and/or full expiration (exhalation) when $dy/dt=0$, inhalation when $dy/dt>0$, and exhalation when $dy/dt<0$, although it will be appreciated that the respiratory cycle may be divided into any suitable portions. Although embodiments are discussed herein including a derivative $(dy/dt)$ in spatial coordinates, it will be appreciated that a derivative may be generated in any suitable coordinate system. For example, a detector coordinate system include a detector (D) coordinate and a row (r) coordinate, such that a squared derivative $(dp/dD)^2$ may be used to identify a skin surface, where dp is a derivative of the CT projection data $P(D,R,t)$.

For example, in some embodiments, the system is configured to identify an edge within successive lateral views (e.g., CT scan data sets representing successive lateral views). The edge corresponds to the position of the outer boundary of the patient's scanned image, such as the patient's skin (e.g., skin surface, clothing, etc.) above a fixed location, such as the top surface of a patient bed(e.g., moveable patient bed 18). In some embodiments, a reference) position may be established by including a separate object configured to move at a similar and/or identical rate to movement of the patient's skin during a reading. The separate object provides a known edge and position to allow calculation of movement with respect to the edge identified for the patient (e.g., patient's skin).

Figure 4:
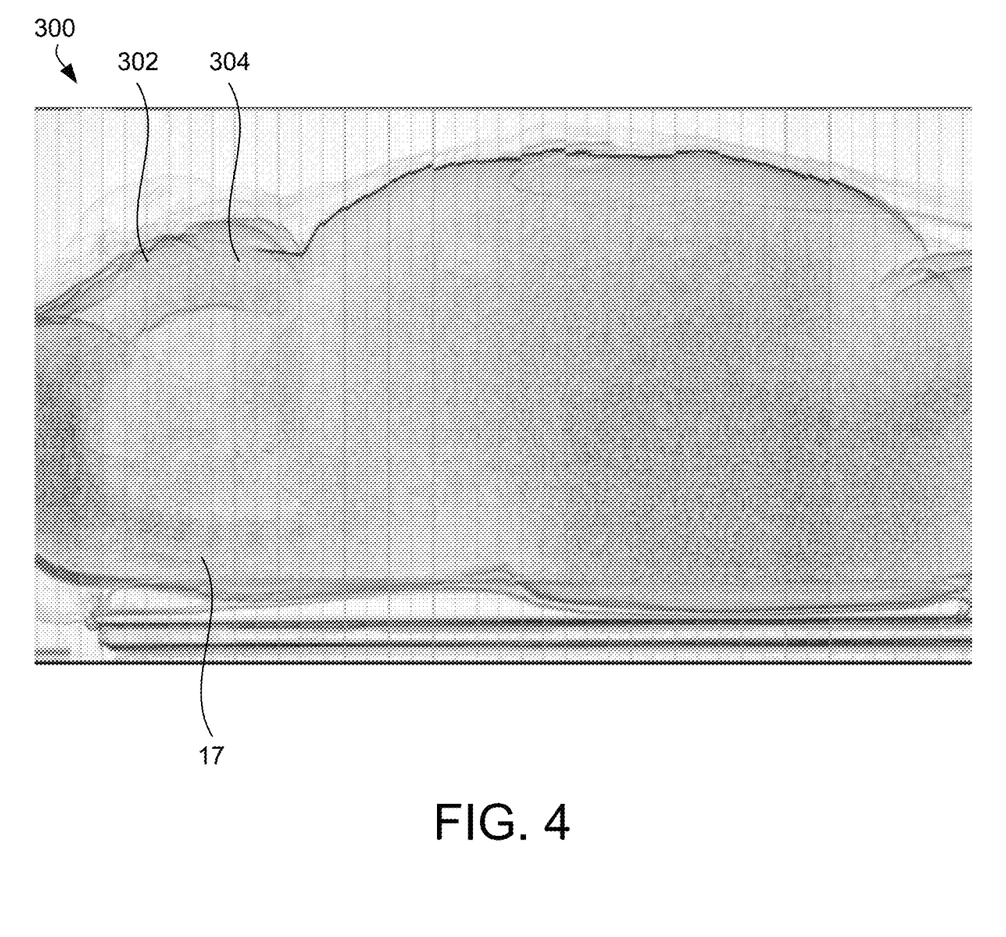
FIG. 4 illustrates a right lateral view of a patient projected from CT scan data, in accordance with some embodiments.

In some embodiments, line segments are generated along the edge to represent the patient's skin. The generated line segments may have predetermined lengths covering a predetermined axial area, such as, for example, 1 cm, 2 cm, 3 cm, etc. In other embodiments, a continuous line is generated for all data extending from a first axial position to a second axial position. For example, FIG. 4 illustrates a CT projection 300, in accordance with some embodiments. The CT projection 300 includes a first curve 302 illustrating a vertical (e.g., y-position) of CT scan data captured on a first side of a patient 17 and a second curve 304 illustrating axial overlapping CT scan data captured on a second side of a patient 17. Each of the curves 302, 304 corresponds to an edge of the CT scan data (e.g., a patient's skin surface).

The system is configured to compare axially overlapping edges identified in the CT scan data. For example, in some embodiments, the generated line segments in successive lateral views are compared to identify a distance (or Δy) between a first line segment and a second line segment for overlapping axial (e.g., anatomic) positions. Successive lateral views may be based, for example, on the measurement interval of the first imaging modality. As shown in FIG. 4, the first curve 302 is offset from the second curve 304 by an vertical offset corresponding to respiratory motion of the patient during movement of the CT imaging modality from the first side to the second side of the patient. Although embodiments are discussed herein including vertical offset, it will be appreciated that any offset between the overlapping axial positions may be measured. For example, in various embodiments, an offset may be determined in a vertical direction, horizontal direction, and/or a combined vertical and horizontal direction.

Figure 5:
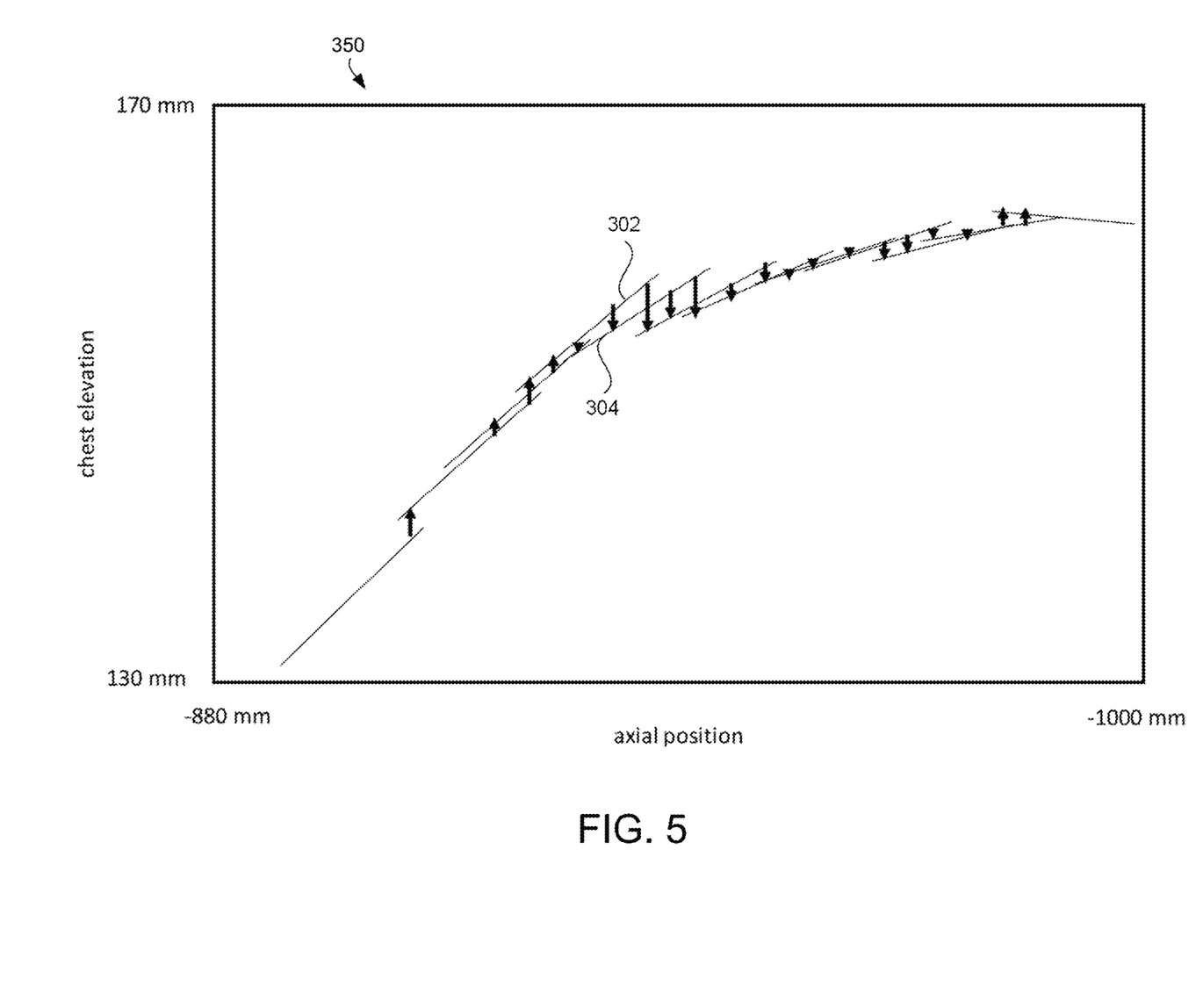
FIG. 5 is a chart illustrating the first curve and the second curve graphed against the movement of the moveable patient bed during the CT scan (e.g., the x-axis), in accordance with some embodiments.

FIG. 5 is a chart 350 illustrating the first curve 302 and the second curve 304 graphed against the movement of the moveable patient bed 18 during the CT scan (e.g., the x-axis). The direction of movement between the first curve 302 and the second curve 304 are illustrated as arrows extending between the two curves. The distance (Δy) between the line segments with respect to the change in time (Δt) between the successive lateral views approximates the derivative (dy/dt), which is expected to be proportional to the derivative of the respiratory waveform, after accounting for a scaling factor h(z) that expresses the amount of respiratory motion at that overlapping axial position (e.g. anatomic position). The factor h(z) is large, for example, in the sternal region where breathing motions are relatively large, and it is small in the upper part of the chest and the lower belly, two locations where breathing motions are relatively small.

In some embodiments, a right-most portion of each successive view may have a predetermined overlap, such as a 20% overlap, with the next view to the right. A respiration-related change in abdominal position between data capture on a first side of the patient and data capture on the second side of the patient includes a change in vertical position of the patient's skin at the time of data capture. The change in distance is equal to the change over time of the respiratory curve.

Figure 6:
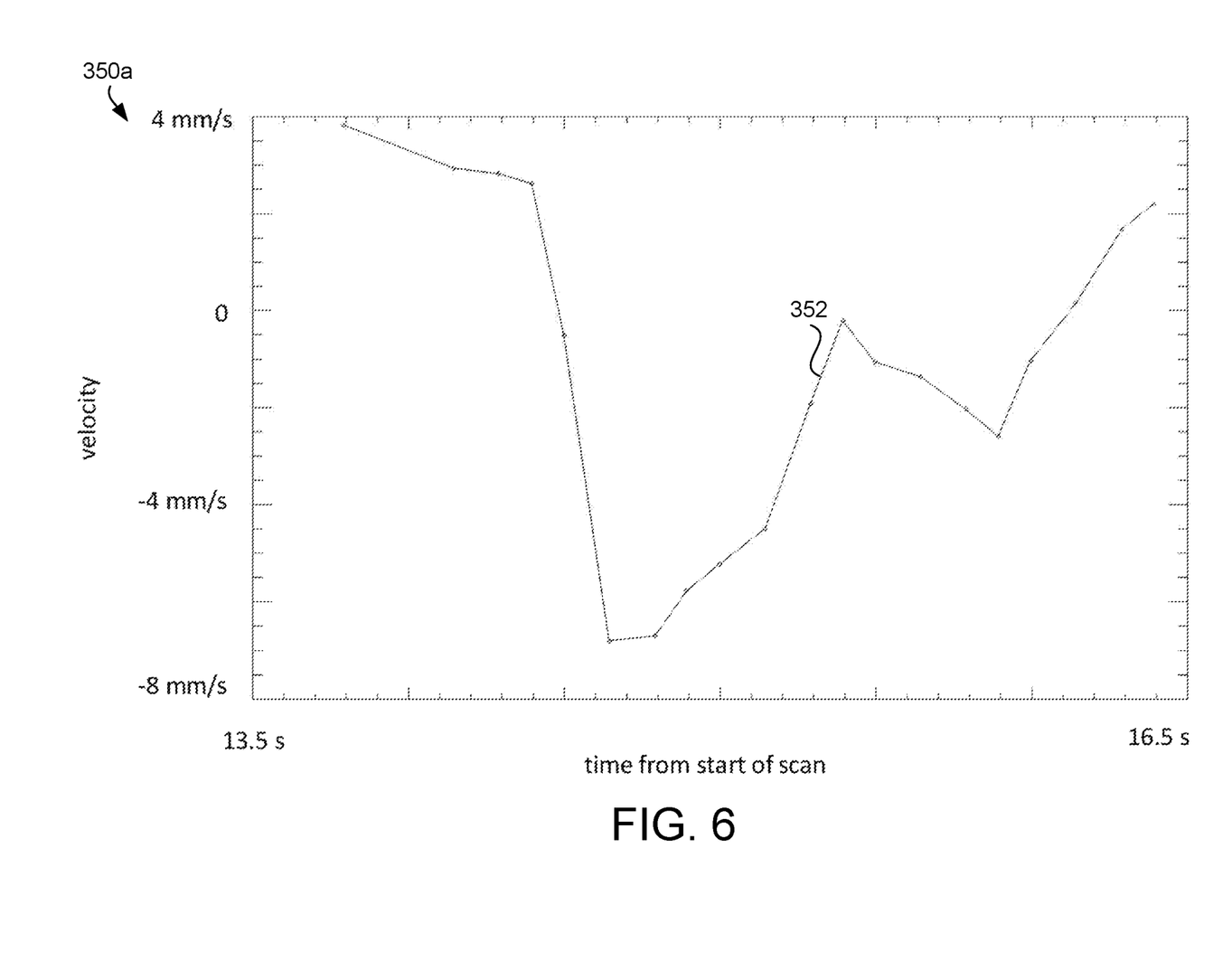
FIG. 6 is a chart illustrating a first curve representative of the vertical position for overlapping axial positions for a projected CT image, in accordance with some embodiments.

FIG. 6 is a chart 350a including a first curve 352 representative of the vertical position for overlapping axial positions. The X-axis of the chart 350a represents the time from the start of the scan and the Y-axis of the chart 350a represents the difference in position (or velocity) between a first side scan and a second side scan. Although embodiments are discussed herein using graphical representations (e.g., curves), it will be appreciated that the numerical derivative may be used to identify zero points, e.g., maximum or minimums without the use of a generated curve.

With reference again to FIG. 2, at step 106, the respiratory waveform is estimated from the calculated time derivative. For example, in some embodiments, the skin height of a patient during a CT scan can be represented by the equation:

$$y(z,t)=h(z) \times w(t)$$

where z is the axial position, t is time, w(t) is the respiratory waveform that would be measured by measurement hardware (for example, a pressure sensor), and h(z) is described above. Taking the derivative with respect to time and rearranging the above equation provides an equation for the time derivative of the respiratory waveform as:

$$dw(t)/dt=(\Delta y/\Delta t)/h(z)$$

where Δy is the change in vertical position and Δt is the change in time. The respiratory waveform can be estimated by time-integration of the above equation. In some embodiments, the integration includes a numerical integration.

Figure 7:
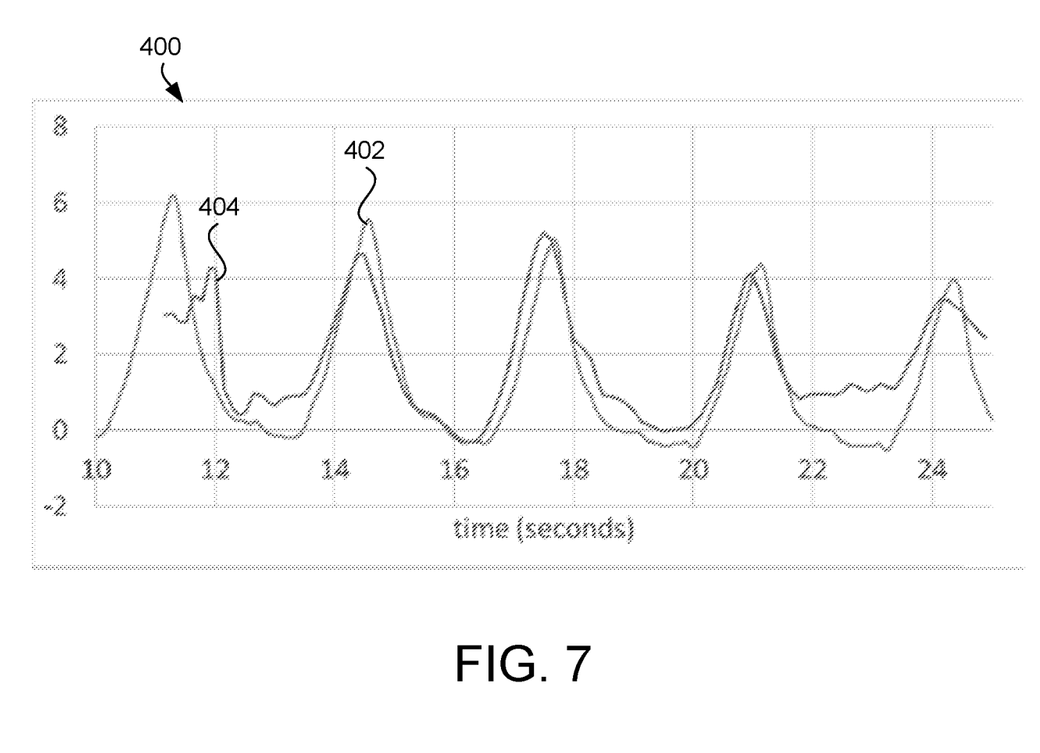
FIG. 7 is a chart illustrating a measured respiratory waveform versus an estimated respiratory waveform, in accordance with some embodiments.

FIG. 7 is a chart 400 illustrating a measured respiratory waveform 402 versus an estimated respiratory waveform 404. The measured respiratory waveform 402 was generated based on data captured by a hardware measurement device, such as, for example, a pressure sensor. The estimated respiratory waveform 404 was generated according to the method 100. As illustrated in FIG. 7, the estimated respiratory waveform 404 is substantially overlapping and within a margin of error with respect to the measured respiratory waveform 402 such that the estimated respiratory waveform 404 may be used for waveform matching reconstruction, as discussed in greater detail below. In other embodiments, the respiratory waveform may be generated by applying phase-based respiratory gating based on inspiration peaks, expiration peaks, etc.

With reference again to FIG. 2, at step 108, second image scan data, such as PET data, is received by an imaging modality, such as the second imaging modality 14 as illustrated in FIG. 1. The PET data may correspond to a second time period. The second time period may be partially and/or completely overlapping with the first time period. In some embodiments, the PET data is received and stored as listmode PET data, although it will be appreciated that the PET data may be received and stored in any suitable format.

At step 110, PET-DDG is performed and, at step 112, a second respiratory waveform for the PET image data is estimated. The PET-DDG may be performed according to any known method for data-driven gating generation of a second respiratory waveform. For example, in various embodiments, a DDG approach based on a spectral analysis method, a geometric sensitivity method, the Kesner algorithm, and/or a segmented center-of-mass approach may be used for the listmode PET data. Although specific embodiments are discussed herein, it will be appreciated that any suitable PET-DDG method may be applied.

At step 114, waveform matching is performed to generate a waveform matched output image. Waveform matching may be performed according to any suitable method. In some embodiments, the estimated CT respiratory waveform and the estimated PET respiratory waveform are combined to generate a scan respiratory waveform that is used, in conjunction with the PET listmode data, to generate a waveform matched reconstructed image of a patient. The waveform-matched reconstructed image may be used for diagnostic assessment, surgical planning, and/or any other suitable purpose.

In one embodiment, a method of image reconstruction includes receiving, by a processor, first image scan data corresponding to a spiral CT modality received during a first time period. The first image scan data includes at least partially overlapping axial positions. The method further includes determining, by the processor, a change in position over time for each of the at least partially overlapping axial positions and determining, by the processor, a first respiratory waveform from the change in position over time for each of the at least partially overlapping axial positions.

The change in position over time approximates the derivative of the respiratory waveform based on time integration of the change in position over time for each of the at least partially overlapping axial positions. The derivative of the respiratory waveform (dw/dt) may be equal to $dw(t)/dt = (\Delta y/\Delta t)/h(z)$, where $\Delta y$ is a change in vertical position, $\Delta t$ is a change in time, and $h(z)$ is a scaling factor.

The method of image reconstruction may further include receiving, by the processor, second image data corresponding to a second imaging modality received during a second time period, determining, by a processor, a second respiratory waveform for the second image data, and generating a waveform matched reconstructed image using the first respiratory waveform, the second respiratory waveform, and the second image data.

The spiral CT modality includes a predetermined pitch configured such that an x-y projection is constant for variable cone-beam measurements caused by the spiral CT modality's movement along a z-axis. A time of rotation of the CT image modality may be configured to provide measurements for at least partially overlapping axial positions at different times.

In one embodiment, a system includes a spiral CT scanner configured to obtain first image scan data during a first time period, wherein the first image scan data includes at least partially overlapping axial positions. The system further includes a computer configured to receive the first image scan data, determine a change in position over time for each of the at least partially overlapping axial positions, and determine a first respiratory waveform from the change in position over time for each of the at least partially overlapping axial positions.

The change in position over time is used to estimate a derivative of the respiratory waveform. The respiratory waveform may be determined by taking an integral of the change in position over time for each of the at least partially overlapping axial positions. The integral may be a numerical integral. The derivative of the respiratory waveform (dw/dt) may be equal to $dw(t)/dt = (\Delta y/\Delta t)/h(z)$, where $\Delta y$ is a change in vertical position, $\Delta t$ is a change in time, and $h(z)$ is a scaling factor.

The computer of the system may be further configured to receive second image data corresponding to a second imaging modality received during a second time period, determine a second respiratory waveform for the second image data, and generate a waveform matched reconstructed image using the first respiratory waveform, the second respiratory waveform, and the second image data.

The spiral CT scanner includes a predetermined pitch configured such that an x-y projection is constant for variable cone-beam measurements caused by the spiral CT scanner's movement along a z-axis. A time of rotation of the spiral CT scanner may be configured to provide measurements at least partially overlapping axial positions at different times.

In one embodiment, a non-transitory computer readable medium storing instructions configured to cause a computer system to execute predetermined steps is disclosed. The instructions are configured to cause the computer system to execute a step of receiving spiral CT scan data received during a first time period. The spiral CT scan data includes at least partially overlapping axial positions. The instructions further configure the computer system to execute steps of determining a change in position over time for each of the at least partially overlapping axial positions and determining a first respiratory waveform from the change in position over time for each of the at least partially overlapping axial positions. The change in position over time is equal to a derivative of the respiratory waveform. The respiratory waveform is determined by taking an integral of the change in position over time for each of the at least partially overlapping axial positions.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A method of image reconstruction, comprising:
   receiving, by a processor, first image scan data corresponding to a spiral CT modality received during a first time period, wherein the first image scan data includes at least partially overlapping axial positions;
   determining, by the processor, a change in vertical position over time for each of the at least partially overlapping axial positions; and
   determining, by the processor, a first respiratory waveform from the change in vertical position over time for each of the at least partially overlapping axial positions, wherein the change in vertical position over time is equal to a derivative of the first respiratory waveform, and wherein the first respiratory waveform is determined by taking an integral of the change in vertical position over time for each of the at least partially overlapping axial positions.

2. The method of image reconstruction of claim 1, wherein the integral is a numerical integral.

3. The method of image reconstruction of claim 1, wherein the derivative of the respiratory waveform (dw/dt) is equal to:

$$\frac{dw(t)}{dt} = \frac{\frac{\Delta y}{\Delta t}}{h(z)}$$

where $\Delta y$ is a change in vertical position, $\Delta t$ is a change in time, and $h(z)$ is a scaling factor.

4. The method of image reconstruction of claim 1, comprising:
receiving, by the processor, second image data corresponding to a second imaging modality received during a second time period; and
determining, by the processor, a second respiratory waveform for the second image data.

5. The method of image reconstruction of claim 4, comprising generating a waveform matched reconstructed image using the first respiratory waveform, the second respiratory waveform, and the second image data.

6. The method of image reconstruction of claim 4, wherein the first image modality is a computed tomography modality and the second image modality is a positron emission modality.

7. The method of image reconstruction of claim 1, wherein the first imaging modality includes a predetermined pitch configured to provide partially overlapping axial positions.

8. The method of image reconstruction of claim 1, wherein a time of rotation of the first image modality is configured to provide measurements at least partially overlapping axial positions at different times.

9. A system, comprising:
a first imaging modality configured to obtain first image scan data during a first time period, wherein the first image scan data includes at least partially overlapping axial positions; and
a computer, configured to:
receive the first image scan data;
determine a change in vertical position over time for each of the at least partially overlapping axial positions; and
determine a first respiratory waveform from the change in vertical position over time for each of the at least partially overlapping axial positions, wherein the change in vertical position over time is equal to a derivative of the first respiratory waveform, and wherein the first respiratory waveform is determined by taking an integral of the change in vertical position over time for each of the at least partially overlapping axial positions.

10. The system of claim 9, wherein the integral is a numerical integral.

11. The system of claim 9, wherein the derivative of the respiratory waveform (dw/dt) is equal to:

$$\frac{dw(t)}{dt} = \frac{\frac{\Delta y}{\Delta t}}{h(z)}$$

where $\Delta y$ is a change in vertical position, $\Delta t$ is a change in time, and $h(z)$ is a scaling factor.

12. The system of claim 9, comprising:
receiving, by the processor, second image data corresponding to a second imaging modality received during a second time period; and
determining, by a processor, a second respiratory waveform for the second image data.

13. The system of claim 12, comprising generating a waveform matched reconstructed image using the first respiratory waveform, the second respiratory waveform, and the second image data.

14. The system of claim 12, wherein the first image modality is a computed tomography modality and the second image modality is a positron emission modality.

15. The system of claim 9, wherein the first imaging modality includes a predetermined pitch configured such that an x-y projection is constant for variable cone-beam measurements caused by the first imaging modality's movement along a z-axis.

16. The system of claim 9, wherein a time of rotation of the first image modality is configured to provide measurements at least partially overlapping axial positions at different times.

17. A non-transitory computer readable medium storing instructions configured to cause a computer system to execute the steps of:
receiving CT scan data received during a first time period, wherein the CT scan data includes at least partially overlapping axial positions;
determining a change in vertical position over time for each of the at least partially overlapping axial positions; and
determining a first respiratory waveform from the change in vertical position over time for each of the at least partially overlapping axial positions, wherein the change in vertical position over time is equal to a derivative of the first respiratory waveform, and wherein the first respiratory waveform is determined by taking an integral of the change in vertical position over time for each of the at least partially overlapping axial positions.

* * * * *